US010216401B2

(12) United States Patent
Kirkpatrick et al.

(10) Patent No.: US 10,216,401 B2
(45) Date of Patent: Feb. 26, 2019

(54) INFORMATION PROCESSING DEVICE AND METHOD FOR MULTI-TOUCH USER INTERFACE

(71) Applicant: Rakuten, Inc., Shinagawa-ku, Tokyo (JP)

(72) Inventors: Eric Kirkpatrick, Tokyo (JP); Takia Ogai, Tokyo (JP)

(73) Assignee: Rakuten, Inc., Tokyo (JP)

(*) Notice: Subject to any disclaimer, the term of this patent is extended or adjusted under 35 U.S.C. 154(b) by 633 days.

(21) Appl. No.: 14/374,328

(22) PCT Filed: Jan. 24, 2013

(86) PCT No.: PCT/JP2013/051430
§ 371 (c)(1),
(2) Date: Jul. 24, 2014

(87) PCT Pub. No.: WO2014/002518
PCT Pub. Date: Jan. 3, 2014

(65) Prior Publication Data
US 2015/0046861 A1 Feb. 12, 2015

(30) Foreign Application Priority Data

Jun. 29, 2012 (JP) .................. 2012-147137

(51) Int. Cl.
*G06F 3/0481* (2013.01)
*G06F 3/0484* (2013.01)
(Continued)

(52) U.S. Cl.
CPC ........ *G06F 3/0486* (2013.01); *G06F 3/04817* (2013.01); *G06F 3/04842* (2013.01); *G06F 3/04883* (2013.01); *G06F 2203/04808* (2013.01)

(58) Field of Classification Search
CPC . G06F 3/0486; G06F 3/04817; G06F 3/04842
See application file for complete search history.

(56) References Cited

U.S. PATENT DOCUMENTS 7,434,170 B2* 10/2008 Novak .............. G06F 17/30749
707/E17.102
7,620,906 B2* 11/2009 Igeta .................... G06F 3/0486
715/759
(Continued)

FOREIGN PATENT DOCUMENTS

JP 2011-76563 A 4/2011
JP 2011-216043 A 10/2011
(Continued)

OTHER PUBLICATIONS

Anand Agarawala, "Entirching the Desktop Metaphor with Physics, Piles and the Pen", 2006, University of Toronto, pp. 1-92.*
(Continued)

*Primary Examiner* — Nicholas Klicos
(74) *Attorney, Agent, or Firm* — Sughrue Mion, PLLC

(57) ABSTRACT

An information processing device includes an acquiring unit and a processing executing unit. The acquiring unit acquires an initial position and a present position relating to a move of a first object and an initial position and a present position relating to a move of a second object. The processing executing unit executes certain processing on the first and the second objects based on the positional relations between the initial positions and the present positions of the first and the second objects. With this configuration, a user can execute processing on the objects with such a simple operation that moves the first and the second objects displayed. Furthermore, a user can execute desired processing by performing an operation to move the objects to adjust the
(Continued)

respective initial positions and the present positions of the objects. This reduces incorrect operations.

8 Claims, 13 Drawing Sheets

(51) Int. Cl.
*G06F 3/0486* (2013.01)
*G06F 3/0488* (2013.01)

(56) References Cited

U.S. PATENT DOCUMENTS

| | | | | |
|---|---|---|---|---|
| 2003/0160825 A1* | 8/2003 | Weber | G06F 3/0486 | 715/769 |
| 2006/0070007 A1* | 3/2006 | Cummins | G06F 3/0486 | 715/769 |
| 2007/0150834 A1* | 6/2007 | Muller | G06F 3/04817 | 715/810 |
| 2007/0234226 A1* | 10/2007 | Szeto | G06F 3/0486 | 715/769 |
| 2008/0092245 A1* | 4/2008 | Alward | G06F 21/316 | 726/28 |
| 2008/0165153 A1* | 7/2008 | Platzer | G06F 1/1626 | 345/173 |
| 2008/0168403 A1* | 7/2008 | Westerman | G06F 3/04883 | 715/863 |
| 2010/0020025 A1* | 1/2010 | Lemort | G06F 3/04883 | 345/173 |
| 2010/0058244 A1* | 3/2010 | Wang | G06F 3/04817 | 715/838 |
| 2010/0083111 A1 | 4/2010 | de los Reyes | | |
| 2010/0088641 A1* | 4/2010 | Choi | G06F 3/0482 | 715/828 |
| 2010/0153844 A1* | 6/2010 | Hwang | G06F 3/04817 | 715/702 |
| 2010/0194701 A1 | 8/2010 | Hill | | |
| 2010/0201634 A1* | 8/2010 | Coddington | G06F 3/04883 | 345/173 |
| 2010/0299595 A1* | 11/2010 | Zalewski | G06F 1/1626 | 715/702 |
| 2010/0299638 A1* | 11/2010 | Choi | G06F 3/04883 | 715/835 |
| 2010/0322485 A1* | 12/2010 | Riddiford | G06F 3/04842 | 382/115 |
| 2011/0029927 A1* | 2/2011 | Lietzke | G06F 3/04812 | 715/835 |
| 2011/0164055 A1* | 7/2011 | McCullough | G06F 3/04845 | 345/642 |
| 2011/0193788 A1* | 8/2011 | King | G06F 3/017 | 345/173 |
| 2011/0246918 A1* | 10/2011 | Henderson | G06F 3/04817 | 715/769 |
| 2011/0252373 A1* | 10/2011 | Chaudhri | G06F 3/04817 | 715/835 |
| 2011/0252383 A1* | 10/2011 | Miyashita | G06F 3/0482 | 715/863 |
| 2011/0273479 A1* | 11/2011 | Ingrassia, Jr. | G06F 3/04886 | 345/666 |
| 2012/0030628 A1* | 2/2012 | Lee | G06F 3/0486 | 715/835 |
| 2012/0042272 A1* | 2/2012 | Hong | G06F 3/04817 | 715/770 |
| 2012/0089947 A1* | 4/2012 | Lee | G06F 3/0483 | 715/839 |
| 2012/0131508 A1* | 5/2012 | Lee | G06F 3/0482 | 715/835 |
| 2012/0147057 A1* | 6/2012 | Lee | G06F 3/0482 | 345/681 |
| 2012/0151400 A1* | 6/2012 | Hong | G06F 3/04817 | 715/769 |
| 2012/0246596 A1* | 9/2012 | Ording | G06F 3/0481 | 715/799 |
| 2013/0014041 A1* | 1/2013 | Jaeger | G06F 3/0481 | 715/765 |
| 2013/0016126 A1* | 1/2013 | Wang | G06F 3/041 | 345/650 |
| 2013/0069885 A1* | 3/2013 | Davidson | G06F 3/0416 | 345/173 |
| 2013/0097542 A1* | 4/2013 | Icho | G06F 17/30032 | 715/769 |
| 2013/0106859 A1* | 5/2013 | Koshi | G06F 3/0484 | 345/440 |
| 2013/0174069 A1* | 7/2013 | Lee | G06F 3/04883 | 715/769 |
| 2014/0040821 A1* | 2/2014 | Carlsson | G06F 3/04845 | 715/800 |
| 2014/0245256 A1* | 8/2014 | Petzoldt | G06F 8/34 | 717/109 |
| 2014/0344734 A1* | 11/2014 | Xu | G06F 3/0488 | 715/765 |

FOREIGN PATENT DOCUMENTS

| | | |
|---|---|---|
| JP | 2011-227703 A | 11/2011 |
| JP | 2012-58858 A | 3/2012 |
| JP | 4943553 B1 | 5/2012 |
| WO | 2010/062348 A2 | 6/2010 |

OTHER PUBLICATIONS

English Translation of International Preliminary Report on Patentability dated Jan. 8, 2015 issued in Patent Application No. PCT/JP2013/051430.
"iPhone User Guide", pp. 22 to 23, [searched on Jun. 19, 2012], <URL: http://manuals.info.apple.com/en_US/iphone_user_guide.pdf>.
International Search Report for PCT/JP2013/051430 dated Apr. 23, 2013 [PCT/ISA/210].

* cited by examiner

Fig.4
(b)
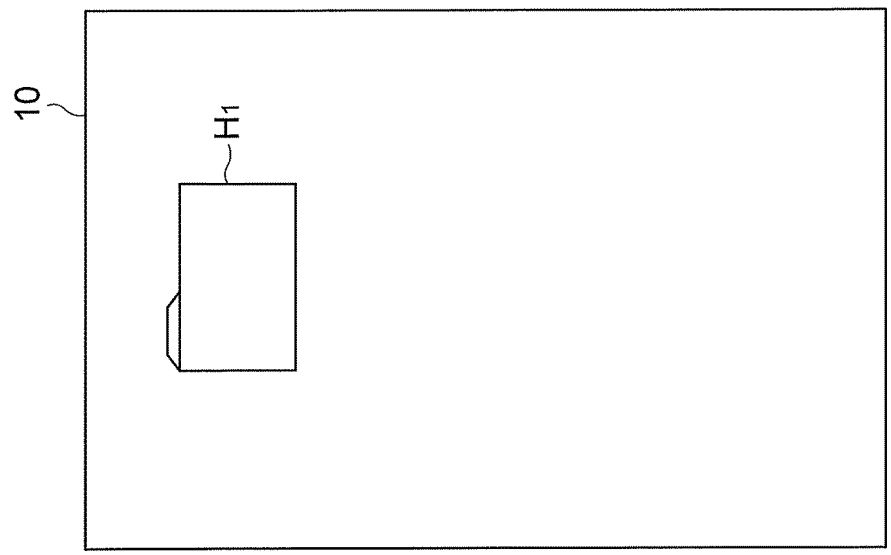
(a)
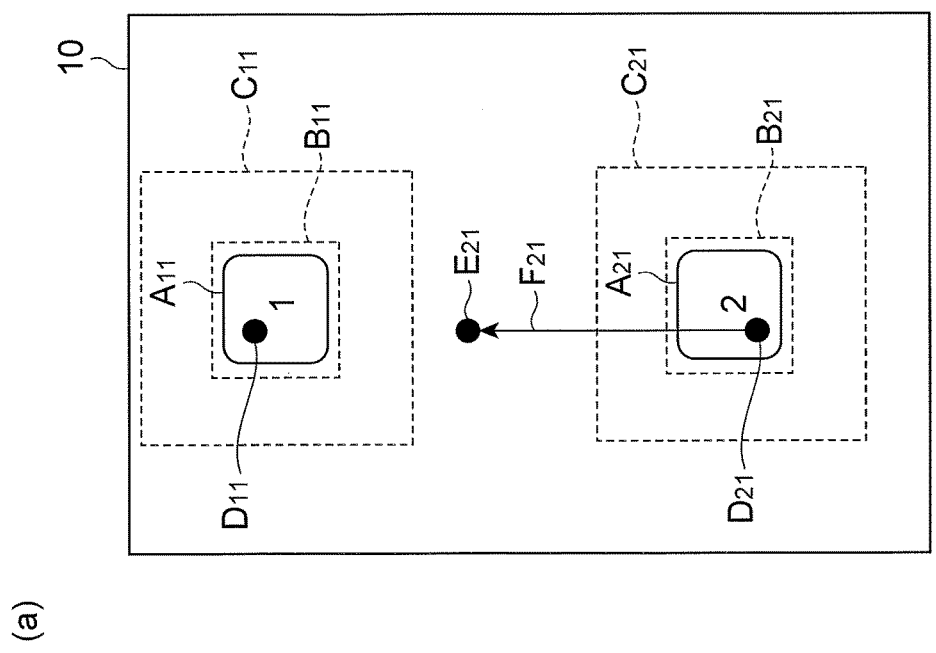

Fig.6
(b)
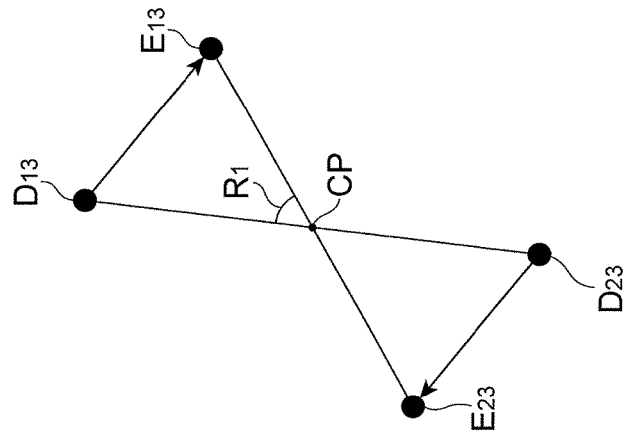
(a)
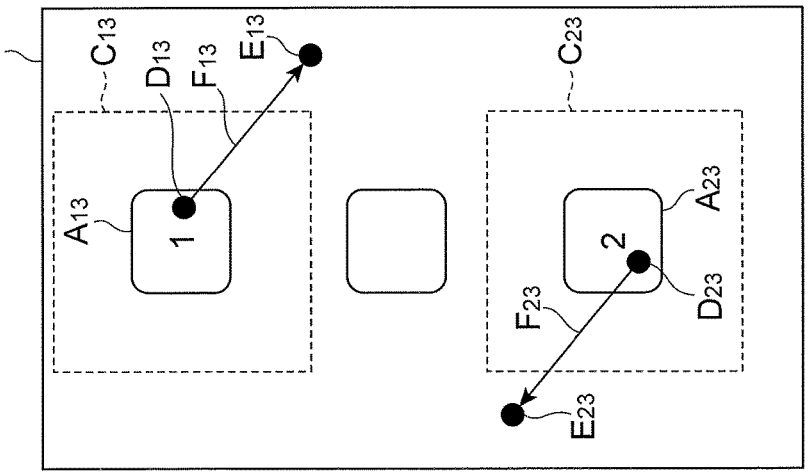

*Fig.12*

| PROCESSING ORDER | SELECTED OBJECT | ROTATION DIRECTION |
|---|---|---|
| 1 | (1, 7) | CLOCKWISE |
| 2 | (1, 9) | COUNTERCLOCKWISE |

INFORMATION PROCESSING DEVICE AND METHOD FOR MULTI-TOUCH USER INTERFACE

CROSS REFERENCE TO RELATED APPLICATIONS

This application is a National Stage of International Application No. PCT/JP2013/051430, filed on Jan. 24, 2013, which claims priority from Japanese Patent Application No. 2012-147137, filed on Jun. 29, 2012, the contents of all of which are incorporated herein by reference in their entirety.

TECHNICAL FIELD

The present invention relates to an information processing device, an authentication device, an information processing method, and an information processing program.

BACKGROUND ART

Such a technique has been known that executes processing on an object, which is one of a plurality of objects arranged and displayed on a touch panel, in response to a drag-and-drop operation input with a finger. For example, the following Non Patent Literature 1 describes moving an object and making a folder to store the object with a drag-and-drop operation on the object.

CITATION LIST

Non Patent Literature

[Non Patent Literature 1] "iPhone User Guide", pages 22 to 23, [online], [searched on Jun. 19, 2012], The Internet <URL: http://manuals.info.apple.com/en_US/iphone_user_guide.pdf>

SUMMARY OF INVENTION

Technical Problem

However, in executing a plurality of different processing on an object with such a drag-and-drop operation, a process different from desired one is sometimes executed, for example, due to a slight difference in positions where to drop the object. Reducing incorrect operations is possible, for example, by separately preparing a function for switching processing modes and thereby switching processing modes before a drop operation; however, this complicates the operation procedure.

It is an object of the present invention to provide a user interface that is possible to reduce incorrect operations without additional operation procedures in an instruction operation for executing desired processing on an object displayed on a touch panel.

Solution to Problem

In view of the above-mentioned problems, an information processing device according to an embodiment of the present invention includes:
display control means for displaying a screen including a plurality of objects on display means; detecting means for detecting a plurality of positions designated by a user on the screen; moving means for, when one of the user designated positions is included in a determination area set based on the position of an object among the objects in a state where the one of the user designated positions is under detection by the detecting means, moving the object in response to a move of the one of the designated positions; initial position acquiring means for acquiring positions of a first and a second objects as respective initial positions at the time when a first designated position and a second designated position are concurrently included in respective determination areas of the first and the second objects; present position acquiring means for, after the initial positions of the first and the second objects are acquired by the initial position acquiring means, when at least one of the first and the second objects is moved by the moving means in a state where the first and the second designated positions are kept under detection by the detecting means, acquiring the positions of the first and the second objects as respective present positions; and processing executing means for executing processing on the first and the second objects when the initial positions of the first and the second objects are in predetermined positional relations with the present positions of the first and the second objects.

An information processing method according to an embodiment of the present invention includes: a display control step of displaying a screen including a plurality of objects on display means; a detecting step of detecting a plurality of positions designated by a user on the screen; an initial position acquiring step of acquiring positions of a first and a second objects as respective initial positions at the time when a first and a second designated positions detected in the detecting step are concurrently included in respective determination areas set based on the positions of the first and the second objects; a moving step of moving at least one of the first and the second objects in response to a move of at least one of the first and the second designated positions in a state where the first and the second designated positions in the respective determination areas of the first and the second objects are kept under detection; a present position acquiring step of acquiring the positions of the first and the second objects as respective present positions after the move of at least one of the first and the second objects in the moving step; and a processing executing step of executing processing on the first and the second objects when the initial positions of the first and the second objects are in predetermined positional relations with the present positions of the first and the second objects.

An information processing program according to an embodiment of the present invention causes a computer to implement: a display control function of displaying a screen including a plurality of objects on display means; a detecting function of detecting a plurality of positions designated by a user on the screen; a moving function of, when one of the user designated positions is included in a determination area set based on the position of an object among the objects in a state where the one of the user designated positions is under detection by the detecting function, moving the object in response to a move of the one of the designated positions; an initial position acquiring function of acquiring positions of the first and the second objects as respective initial positions at the time when a first designated position and a second designated position are concurrently included in respective determination areas of the first and the second objects; a present position acquiring function of, after the initial positions of the first and the second objects are acquired by the initial position acquiring function, when at least one of the first and the second objects is moved by the moving function in a state where the first and the second designated positions are kept under detection by the detecting function, acquiring the positions of the first and the second objects as respective present positions; and a processing executing function of executing processing on the first and the second objects when the initial positions of the first and the second objects are in predetermined positional relations with the present positions of the first and the second objects.

According to the above-mentioned embodiments, a user designated position on the display means is detected, at least one of the first and the second objects displayed on the display means is moved by moving the corresponding user designated position detected in a determination area set based on the position of the object, and predetermined processing is executed on the first and the second objects based on the positional relations between the initial positions and the present positions relating to moves of the first and the second objects. This enables a user to execute processing on the objects with such a simple operation that moves the first and the second objects displayed. Furthermore, desired processing is executed by performing an operation to move the objects to adjust the respective initial positions and the present positions of the objects. Incorrect operations are thus reduced.

In the information processing device according to another embodiment, the processing executing means may execute first processing on the first and the second objects when a first distance from the initial position to the present position of the first object is smaller than a predetermined value, a second distance from the initial position to the present position of the second object is equal to or greater than a predetermined value, and the distance between the present position of the first object and the present position of the second object is equal to or smaller than a predetermined value.

In this embodiment, the first processing is executed with an operation to move the second object close to the first object. This enables execution of the first processing by adjusting drag operations on the first and the second objects. A user interface that is simple and hard to cause incorrect operations is thus provided.

In the information processing device according to another embodiment, the processing executing means may execute second processing on the first and the second objects when the first distance from the initial position to the present position of the first object is equal to or greater than a predetermined value, the second distance from the initial position to the present position of the second object is equal to or greater than a predetermine value, a line segment connecting the initial position of the first object and the initial position of the second object intersects with another line segment connecting the present position of the first object and the present position of the second object at a movement center point, and a rotation angle, which is made by a line segment connecting the initial position of the first object and the movement center point and another line segment connecting the present position of the first object and the movement center point and indicates a move of the first object from its initial position to its present position with the movement center point as the center, is equal to or greater than a predetermined angle.

In this embodiment, the second processing is executed when such a drag operation is performed that interchanges positions of the first and the second objects. This enables execution of the second processing by adjusting drag operations on the first and the second objects. A user interface that is hard to cause incorrect operations and intuitive is thus provided.

In the information processing device according to another embodiment, the processing executing means may have a condition to execute the second processing, the condition being whether the first object moves clockwise or counterclockwise from its initial position to its present position with the movement center point as the center.

In an operation of a rotation movement for interchanging the positions of the first and the second objects to execute the second processing, this embodiment defines a rotation direction. This limits the operation mode for executing the second processing and thus reduces incorrect operations.

In the information processing device according to another embodiment, the processing executing means may execute the second processing on the first and the second objects when the first distance from the initial position to the present position of the first object is equal to or greater than a first predetermined value, and the second distance from the initial position to the present position of the second object is equal to or greater than a second predetermined value different from the first predetermined value.

Drag operations on the first and the second objects are likely to be performed with two fingers of different lengths from each other. This embodiment can set a threshold for the amount of a drag operation corresponding to the length of each finger operating the first and the second objects. Examples of the configuration include that the second processing is executed by performing a shorter-distance drag operation on the second object than a drag operation on the first object. This enables an accurate user interface considering the length of fingers likely to be used for the operations.

In the information processing device according to another embodiment, the processing executing means may execute third processing on the first and the second objects when the first distance from the initial position to the present position of the first object is equal to or greater than a predetermined value, the second distance from the initial position to the present position of the second object is equal to or greater than a predetermined value, the distance between the present position of the first object and the present position of the second object is equal to or smaller than a predetermined value, the distance from the initial position of the second object to the present position of the first object is smaller than the distance from the initial position of the second object to the initial position of the first object, and the distance from the initial position of the first object to the present position of the second object is smaller than the distance from the initial position of the first object to the initial position of the second object.

In this embodiment, the third processing is executed when such a moving operation is performed that moves positions of the first and the second objects close to each other and strikes both objects against each other. This enables execution of the third processing by adjusting drag operations on the first and the second objects. A user interface that is hard to cause incorrect operations and intuitive is thus provided.

An authentication device according to an embodiment of the present invention is a device including therein the information processing device. The authentication device includes authenticating means for executing authentication processing on a user by determining whether predetermined processing on a plurality of objects has been executed in the information processing device.

In this embodiment, the authentication processing is executed by determining whether a predetermined drag operation is performed on the first and the second objects. This facilitates input for authentication and provides an authentication device with strict security.

An authentication device according to another embodiment is a device including therein the information processing device. The authentication device may include authenticating means for executing authentication processing on a user by determining whether predetermined interchange processing has been executed on a plurality of preset objects in the information processing device.

In this embodiment, the authentication processing is executed by determining whether interchange processing has been executed on a predetermined object with such a drag operation that interchanges positions of objects. An authentication device with simple and intuitive input operations is thus obtained.

Advantageous Effects of Invention

According to an aspect of the present invention, a user interface is provided that can reduce incorrect operations without additional operation procedures in an instruction operation to execute desired processing on an object displayed on a touch panel.

BRIEF DESCRIPTION OF DRAWINGS

FIG. 4(a) is a diagram illustrating an example of execution of processing on an object by a processing executing unit. FIG. 4(b) is a diagram illustrating an example of first processing.

FIG. 6(a) and FIG. 6(b) are diagrams illustrating an example of a condition to execute second processing.

FIG. 12 is a diagram illustrating an example of a table set with predetermined processing content for authentication processing.

DESCRIPTION OF EMBODIMENTS

Embodiments of the present invention will be described in detail below with reference to the accompanying drawings. It should be noted that in the description of the drawings, the same components are denoted with the same reference signs and an overlapping description is omitted.

Figure 1:
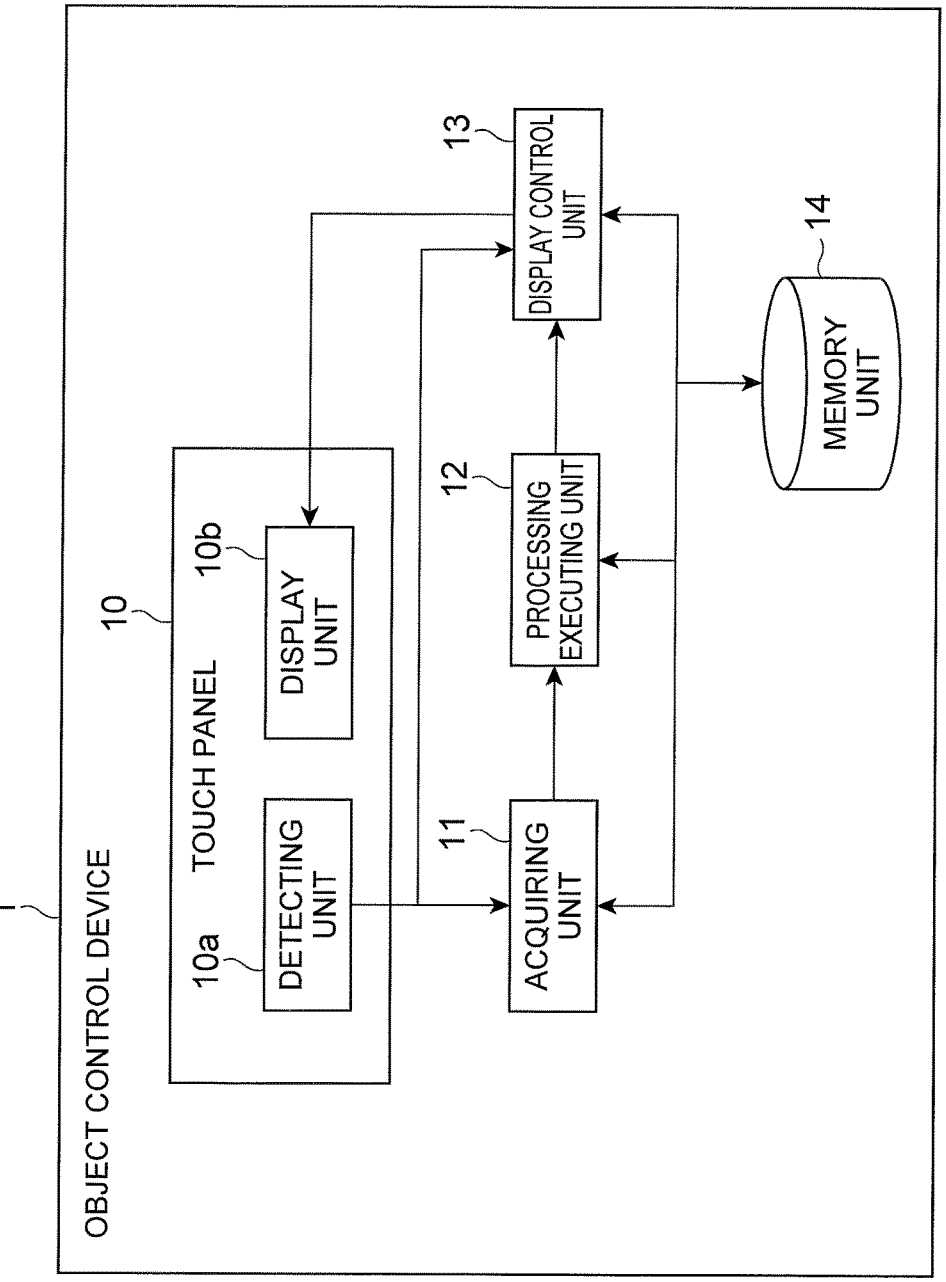
FIG. 1 is a block diagram illustrating a functional configuration of an information processing device.

FIG. 1 is a block diagram illustrating a functional configuration of an information processing device 1 according to an embodiment. The information processing device 1 includes display means for displaying a screen including a plurality of objects and detecting means for detecting an input from a user indicating a position on the display means. Examples of the information processing device 1 include a terminal provided with a touch panel. The touch panel displays an image on its display and has the detecting means for sensing a physical contact to the display, which enables detection of a position where a physical contact is sensed on the display.

Examples of the information processing device 1 may include a personal computer with a display and a pointing device. The display displays an image on its display screen, and the pointing device receives an instruction input designating a position on the display screen. A user operates the pointing device and inputs an instruction to designate a certain position of an image displayed on the display screen.

The information processing device 1 in this embodiment is described with an example of a terminal including a touch panel 10. As illustrated in FIG. 1, the information processing device 1 functionally includes an acquiring unit 11 (initial position acquiring means and present position acquiring means), a processing executing unit 12 (processing executing means), a display control unit 13 (display control means and moving means), and a memory unit 14. The touch panel 10 includes a detecting unit 10a (detecting means) and a display unit 10b (display means). The display unit 10b includes a device such as a display. The detecting unit 10a is capable of detecting a plurality of positions designated by a user on a screen in the display unit 10b and detects a position where a physical contact is sensed on a display.

Figure 2:
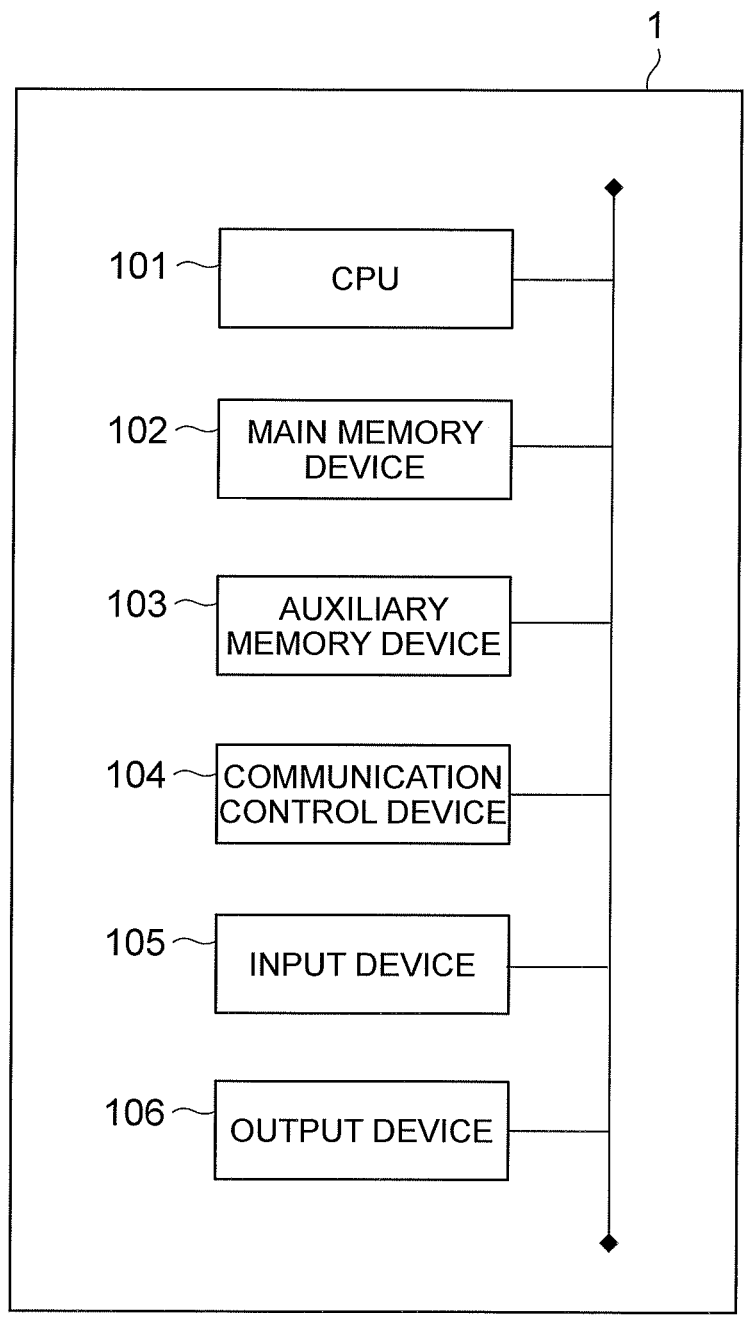
FIG. 2 is a diagram illustrating a hardware configuration of the information processing device.

FIG. 2 is a hardware configuration diagram of the information processing device 1. As illustrated in FIG. 2, the information processing device 1 is physically configured as a computer system that includes a CPU 101, a main memory device 102 including a memory such as a random access memory (RAM) and a read only memory (ROM), an auxiliary memory device 103 including a hard disk or other devices, a communication control device 104 including a network card or other devices, an input device 105 such as a keyboard and a mouse, and an output device 106 such as a display.

The functions illustrated in FIG. 1 are implemented by loading predetermined certain computer software (an information processing program) onto hardware including, for example, the CPU 101 and the main memory device 102 illustrated in FIG. 2 to operate the communication control device 104, the input device 105, and the output device 106 under the control of the CPU 101, and by reading and writing data stored in the main memory device 102 and the auxiliary memory device 103. Data and a database required for processing are stored in the main memory device 102 and the auxiliary memory device 103.

An object as a target of processing in this embodiment may be an icon representing a file, a collection of texts, and a text box. The object includes a variety of attribute information corresponding to its type, and the attribute information is stored in the memory unit 14 in a manner associated with the object. The attribute information of the object includes information on an application represented with the object as an icon, content of a text in the object as a text box, and the like.

Figure 3:
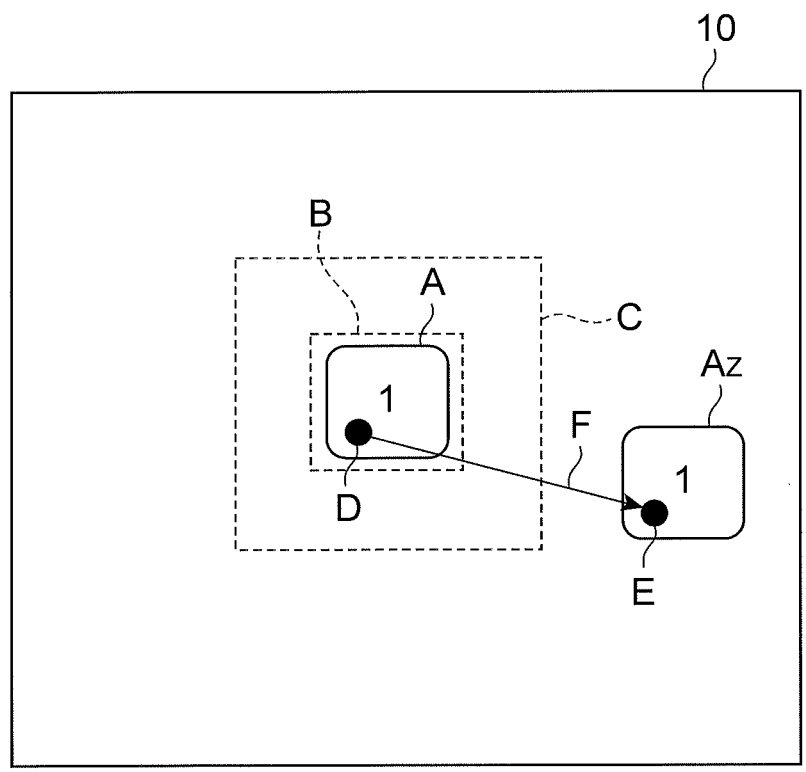
FIG. 3 is a diagram schematically illustrating input on an object displayed on a touch panel.

The acquiring unit 11 acquires a user designated position detected by the detecting unit 10a. The processing of acquiring an input performed by the acquiring unit 11 is described with reference to FIG. 3. FIG. 3 is a diagram schematically illustrating an input on an object displayed on the touch panel 10. As illustrated in FIG. 3, the object displayed on the touch panel 10 has a determination area B to recognize a selecting operation on the object. The determination area B is a range set based on the position of the object, and information indicating the range is stored in the memory unit 14 in a manner associated with the object A.

When the acquiring unit 11 acquires a user designated position D in the determination area B, the acquiring unit 11 acquires an input of the designated position as a selection input to select the object A. The acquiring unit 11 thereafter acquires, as an initial position of the object, the position of the object A obtained when the acquiring unit 11 acquired the user designated position D in the determination area B.

Moving processing executed on an object by the display control unit 13 is described with reference to FIG. 3. When one of the user designated positions is included in the determination area B of the object in a state where the one of the designated positions is under detection of the detecting unit 10a, the display control unit 13 moves the object in response to a move of the one of the designated positions. As illustrated in FIG. 3, when the designated position D is moved to a position E with a drag operation, the display control unit 13 moves the position of the object A to the position represented by an object Az in response to the move of the designated position. The acquiring unit 11 acquires the position of the object Az as a present position of the object.

The information processing device 1 in this embodiment executes processing on a first and a second objects in response to a drag operation on the first and the second objects. The acquiring unit 11 acquires positions of the first and the second objects as respective initial positions at the time when a first designated position and a second designated position detected by the detecting unit 10a are concurrently included in respective determination areas of the first and the second objects displayed on the display unit 10b. After the acquisition of the initial positions, when at least one of the first and the second objects is moved in response to a move of the corresponding designated position in a state where the first and the second designated positions in the respective determination areas B of the first and the second objects are under detection of the detecting unit 10a, the acquiring unit 11 acquires the positions of the first and the second objects as respective present positions. Hereinafter, the initial position of the first object is referred to as "a first initial position", the present position of the first object as "a first present position", the initial position of the second object as "a second initial position", and the present position of the second object as "a second present position".

The processing executing unit 12 executes processing on the first and the second objects when the first and the second initial positions are in predetermined positional relations with the first and the second present positions, respectively. The processing executing unit 12 causes the display unit 10b to display a screen corresponding to a result of executed processing through the display control unit 13. Processing executed by the processing executing unit 12 will be described later in detail.

The processing executing unit 12 can execute processing on the first and the second objects if the distance from the first initial position to the first present position and the distance from the second initial position to the second present position correspond to a predetermined case. Hereinafter, the distance from the first initial position to the first present position is referred to as "a first distance", and the distance from the second initial position to the second present position is referred to as "a second distance". Specifically, the processing executing unit 12 can determine whether to execute processing on the first and the second objects based on whether the first distance and the second distance are smaller than a predetermined value.

FIG. 3 illustrates an area where the first or the second distance for a move of an object is smaller than a predetermined value as a predetermined area C corresponding to the object A. In the example of FIG. 3, because the termination of an arrow F indicating a distance for a move of the object is positioned outside the predetermined area C, the processing executing unit 12 determines that the distance for the move of the object is equal to or greater than a predetermined value. Information indicating the range of the predetermined area C of each object A is stored, for example, in the memory unit 14.

The display control unit 13 causes the display unit 10b to display thereon a screen including a plurality of objects. The display unit 10b displays a screen including objects and corresponding to a result of processing executed by the processing executing unit 12. Furthermore, as described earlier, the display control unit 13 moves an object displayed on the display unit 10b in response to a move of a designated position indicated in the determination area B of the object. Specifically, the display control unit 13 executes processing such as for changing a display position of an object to be displayed on the display unit 10b while accessing attribute information of each object stored in the memory unit 14.

FIG. 4(a) is a diagram illustrating an example of processing on an object executed by the processing executing unit 12. In the example of FIG. 4(a), a first object $A_{11}$ and a second object $A_{21}$ are displayed on the touch panel 10. The first object $A_{11}$ and the second object $A_{21}$ may be icons.

When acquiring designated positions $D_{11}$ and $D_{21}$ at a time in respective determination areas $B_{11}$ and $B_{21}$ of the first object $A_{11}$ and the second object $A_{21}$ through the detecting unit 10a, the designated positions $D_{11}$ and $D_{21}$ being designated respectively with, for example, an index finger and a thumb of a user, the acquiring unit 11 acquires the designated positions $D_{11}$ and $D_{21}$ as a first initial position and a second initial position, respectively.

When a drag operation to move the second object $A_{21}$ close to the first object $A_{11}$ is performed toward a position $E_{21}$, the second object $A_{21}$ is moved in the direction indicated by an arrow $F_{21}$. The acquiring unit 11 acquires positions of the first object $A_{11}$ and the second object $A_{21}$ at the time as the first present position and the second present position, respectively. In this example, the second distance indicated by the arrow $F_{21}$ exceeds a movement distance that is smaller than a predetermined value and indicated as a second predetermined area $C_{21}$. In this case, almost no drag operations is performed on the first object $A_{11}$, and the first distance of the first object $A_{11}$ is thus substantially at a value of zero.

If the first distance from the initial position to the present position of the first object $A_{11}$ is smaller than a predetermined value and the second distance from the initial position to the present position of the second object $A_{21}$ is equal to or greater than a predetermined value, the processing executing unit 12 can execute first processing on the first and the second objects. As another condition to execute the first processing, the position of the second object $A_{21}$ that has been moved in response to the move of the designated position $D_{21}$ to the position $E_{21}$ should exist within a predetermined distance from the present position of the first object $A_{11}$. In this way, the first processing is executed with a drag operation to move the second object close to the first object. A user interface that is simple to operate and hard to cause incorrect operations is thus provided.

FIG. 4(b) is a diagram illustrating an example of the first processing. In the example of FIG. 4(b), a folder $H_1$ is generated, and the first object $A_{11}$ and the second object $A_{21}$ are stored in the generated folder $H_1$. In other words, the processing executing unit 12 generates the folder $H_1$ and stores the first object $A_{11}$ and the second object $A_{21}$ in the folder $H_1$. In this example, such an intuitive user interface is provided that stores the first and the second objects in a folder by dragging the second object toward the display position of the first object.

Figure 5:
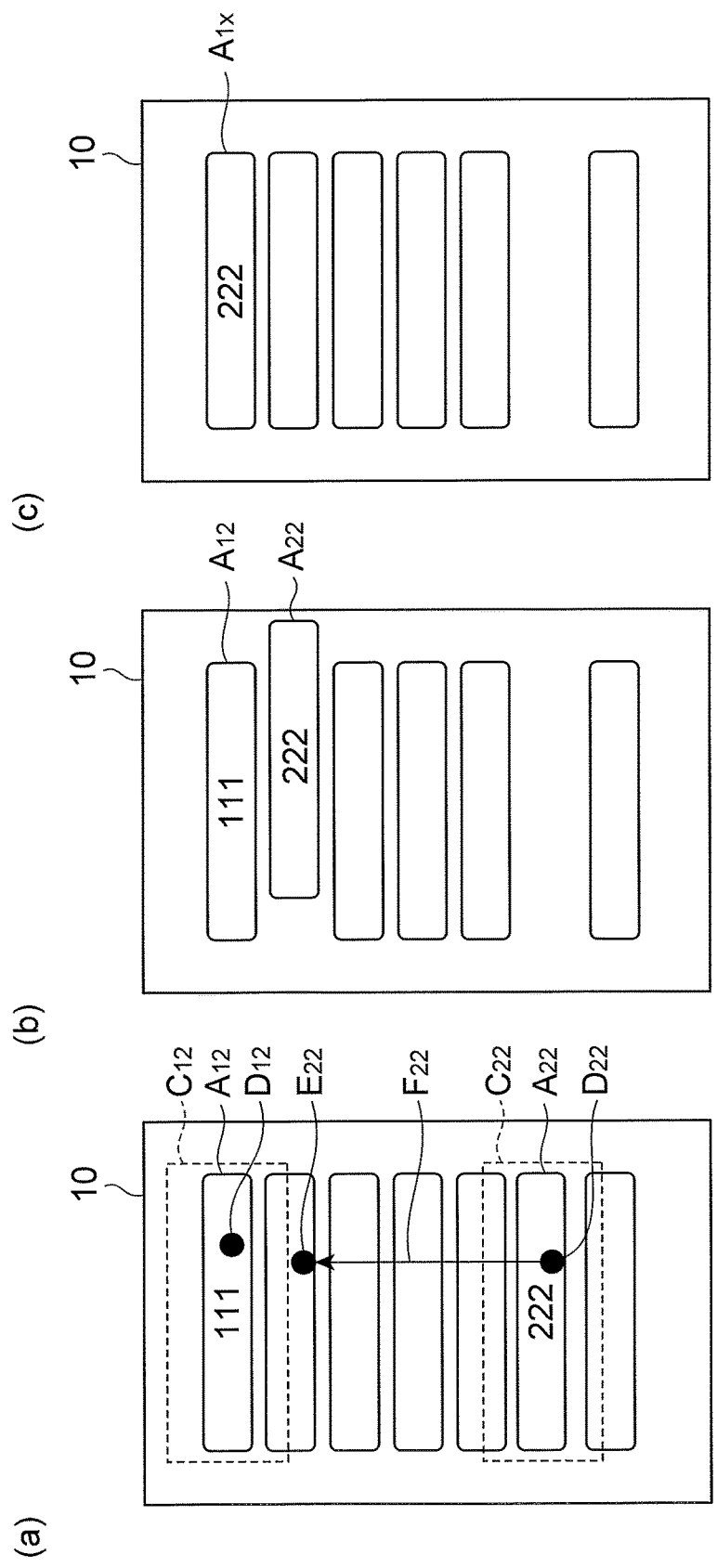
FIG. 5(a) is a diagram illustrating an example of processing on an object composed of a text box.
FIG. 5(b) is a diagram illustrating an example of the first processing.
FIG. 5(c) is a diagram illustrating another example of the first processing.

FIGS. 5(a) to 5(c) are diagrams illustrating examples in which an object for processing is a text box. In the example of FIG. 5(a), a first object $A_{12}$ and a second object $A_{22}$ each configured as a text box are displayed on the touch panel 10.

In the example of FIG. 5(a), similarly to the example of FIG. 4(a), when acquiring designated positions $D_{12}$ and $D_{22}$ at a time in the respective determination areas of the first object $A_{12}$ and the second object $A_{22}$ through the detecting unit 10a, the designated positions $D_{12}$ and $D_{22}$ being designated respectively with, for example, an index finger and a thumb of a user, the acquiring unit 11 acquires the designated positions $D_{12}$ and $D_{22}$ as the first initial position and the second initial position, respectively. When a drag operation to move the second object $A_{22}$ close to the first object $A_{12}$ is thereafter performed, the second object $A_{22}$ is moved in the direction indicated by an arrow $F_{22}$. The acquiring unit 11 acquires the positions of the first object $A_{12}$ and the second object $A_{22}$ after the move as the first present position and the second present position, respectively. In this example, the second distance indicated by the arrow $F_{22}$ exceeds a movement distance that is smaller than a predetermined value and indicated as a second predetermined area $C_{22}$. In this case, almost no drag operations is performed on the first object $A_{12}$, and the first distance of the first object $A_{12}$ is substantially at a value of zero.

The processing executing unit 12 determines that the first distance of the first object $A_{12}$ is smaller than a predetermined value and the second distance indicated by the arrow $F_{22}$ is equal to or greater than a predetermined value. In addition, if the present position of the second object $A_{22}$ exists within a predetermined distance from the present position of the first object $A_{12}$, the processing executing unit 12 executes the first processing on the first and the second objects.

FIG. 5(b) is a diagram illustrating an example of the first processing. In the example of FIG. 5(b), the processing executing unit 12 correlates the second object $A_{22}$ to the first object $A_{12}$ as the first processing. Specifically, the processing executing unit 12 regards the text "222" as a text that belongs to the text "111" and displays the text "222" in a manner correlated with the text "111". With this example, such an intuitive user interface is provided that correlates the second object to the first object by, for example, dragging the second object toward the display position of the first object.

FIG. 5(c) is a diagram illustrating another example of the first processing. In the example of FIG. 5(c), the processing executing unit 12 executes overwriting processing on information of the first object $A_{12}$ with information of the second object $A_{22}$. Specifically, the processing executing unit 12 overwrites the content in the text box of the first object $A_{12}$ with the text "222" and displays a text box $A_{1x}$ including the text "222" at a position where the text box of the first object $A_{12}$ has been displayed. Although the text box of the second object $A_{22}$ is deleted in the example of FIG. 5(c), the text box may be displayed instead of being deleted. The FIG. 5(c) illustrates an example in which a text in a text box is overwritten. In another case, attribute information of the first object $A_{12}$ may be overwritten with attribute information of the second object $A_{22}$. With this example, such an intuitive user interface is provided that overwrites information of the first object with information of the second object by, for example, dragging the second object toward the display position of the first object.

FIG. 6(a) is a diagram illustrating another example of processing on an object executed by the processing executing unit 12. In the example of FIG. 6(a), a first object $A_{13}$ and a second object $A_{23}$ are displayed on the touch panel 10. The first object $A_{13}$ and the second object $A_{23}$ may be icons.

When acquiring designated positions $D_{13}$ and $D_{23}$ at a time in respective determination areas of the first object $A_{13}$ and the second object $A_{23}$ through the detecting unit 10a, the designated positions $D_{13}$ and $D_{23}$ being designated respectively with, for example, an index finger and a thumb of a user, the acquiring unit 11 acquires the designated positions $D_{13}$ and $D_{23}$ as the first initial position and the second initial position, respectively.

When drag operations as indicated by arrows $F_{13}$ and $F_{23}$ are performed on the first object $A_{13}$ and the second object $A_{23}$, respectively, the first object $A_{13}$ and the second object $A_{23}$ are moved to positions $E_{13}$ and $E_{23}$, respectively. The acquiring unit 11 acquires the positions of the first object $A_{13}$ and the second object $A_{23}$ at the time as the first present position and the second present position, respectively. In the example of FIG. 6(a), the first present position $E_{13}$ is situated outside a predetermined area $C_{13}$ corresponding to the object $A_{13}$, and the first distance for the move of the first object $A_{13}$ is thus equal to or greater than a predetermined value. The second present position $E_{23}$ is situated outside a predetermined area $C_{23}$ corresponding to the object $A_{23}$, and the second distance for the move of the second object $A_{23}$ is thus equal to or greater than a predetermined value.

FIG. 6(b) is a diagram illustrating positional relations between the first initial position $D_{13}$, the second initial position $D_{23}$, the first present position $E_{13}$, and the second present position $E_{23}$ when the first object $A_{13}$ and the second object $A_{23}$ are moved as illustrated in FIG. 6(a). As FIG. 6(b) illustrates, a movement center point CP is defined as a point where a line segment connecting the first initial position $D_{13}$ and the second initial position $D_{23}$ intersects with another line segment connecting the first present position $E_{13}$ and the second present position $E_{23}$. A rotation angle $R_1$ is defined as an angle that is made by a line segment connecting the first initial position $D_{13}$ and the movement center point CP and another line segment connecting the first present position $E_{13}$ and the movement center point CP, and indicates a move of the first object from the initial position $D_{13}$ to the present position $E_{13}$ with the movement center point CP as the center and a move of the second object from the initial position $D_{23}$ to the present position $E_{23}$ with the movement center point CP as the center.

The processing executing unit 12 executes second processing as predetermined processing on the first and the second objects if the first distance indicated by the arrow $F_{13}$ is equal to or greater than a predetermined value, the second distance indicated by the arrow $F_{23}$ is equal to or greater than a predetermined value, and the rotation angle $R_1$ is equal to or greater than a predetermined angle. In this example, the second processing can be executed by adjusting drag operations on the first and the second objects, which provides a user interface that is hard to cause incorrect operations and intuitive. The processing executing unit 12 may have a condition to execute the second processing, the condition being whether the first object moves clockwise or counter-clockwise from the initial position $D_{13}$ to the present position $E_{13}$ with the movement center point CP as the center.

Drag operations on the first object $A_{13}$ and the second object $A_{23}$ are likely to be performed with two fingers of different lengths from each other. In view of such circumstances, the processing executing unit 12 may execute the second processing as predetermined processing on the first and the second objects if the first distance indicated by the arrow $F_{13}$ is equal to or greater than a first predetermined value and the second distance indicated by the arrow $F_{23}$ is equal to or greater than a second predetermined value different from the first predetermined value.

In this case, a threshold can be set for the amount of a drag operation corresponding to the length of each finger operating the first object $A_{13}$ and the second object $A_{23}$. For example, if the objects are arranged in a manner that the first object $A_{13}$ is likely to be operated with an index finger and the second object $A_{23}$ is likely to be operated with a thumb, the second predetermined value is set smaller than the first predetermined value. Under the configuration, the second processing is executed by performing a shorter-distance drag operation on the second object $A_{23}$ than that on the first object $A_{13}$. This provides an accurate user interface considering the length of a finger that is likely to be used for the operation.

Figure 7:
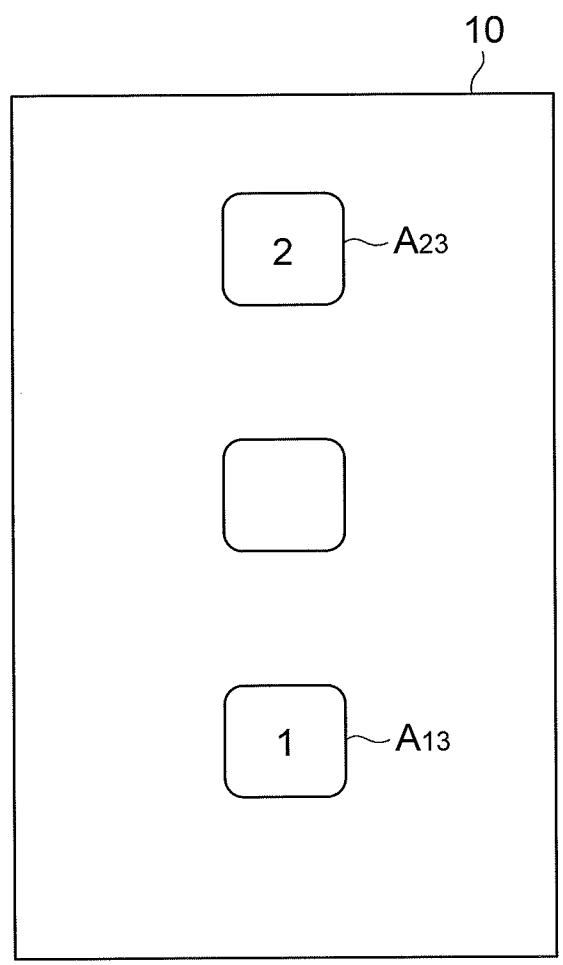
FIG. 7 is a diagram illustrating an example of the second processing.

FIG. 7 is a diagram illustrating an example of the second processing. In the example of FIG. 7, display positions of the first object $A_{13}$ and the second object $A_{23}$ are changed with each other. In other words, the processing executing unit 12 changes the display position of the first object $A_{13}$ with the position where the second object $A_{23}$ has been displayed, and changes the display position of the second object $A_{23}$ with the position where the first object $A_{13}$ has been displayed. With this example, such an intuitive user interface is provided that changes the display positions of the first and the second objects with each other by, for example, dragging appropriately the first and the second objects.

Figure 8:
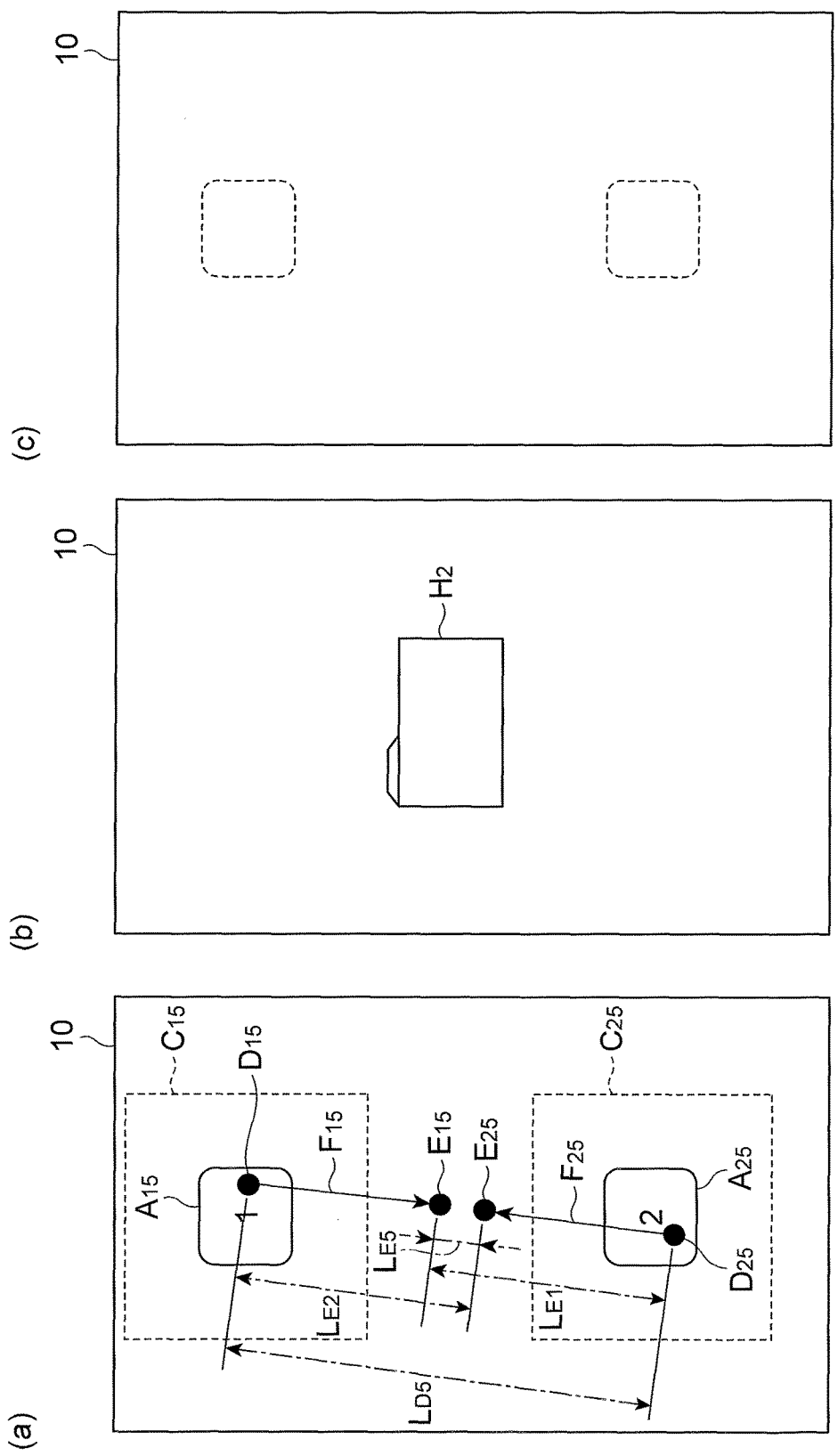
FIG. 8(a) is a diagram illustrating an example of a condition to execute the second processing.
FIG. 8(b) is a diagram illustrating an example of third processing on an object by the processing executing unit.
FIG. 8(c) is a diagram illustrating another example of the third processing.

FIG. 8(a) is a diagram illustrating another example of a decision of processing on an object by the processing executing unit 12. In the example of FIG. 8(a), a first object $A_{15}$ and a second object $A_{25}$ are displayed on the touch panel 10. The first object $A_{15}$ and the second object $A_{25}$ may be icons.

When acquiring designated positions $D_{15}$ and $D_{25}$ at a time in respective determination areas of the first object $A_{15}$ and the second object $A_{25}$ through the detecting unit 10a, the designated positions $D_{15}$ and $D_{25}$ being designated respectively with, for example, an index finger and a thumb of a user, the acquiring unit 11 acquires the designated positions $D_{15}$ and $D_{25}$ as the first initial position and the second initial position, respectively.

When drag operations indicated by arrows $F_{15}$ and $F_{25}$ are performed on the first object $A_{15}$ and the second object $A_{25}$, respectively, the first object $A_{15}$ and the second object $A_{25}$ are moved to positions corresponding to positions $E_{15}$ and $E_{25}$, respectively. The acquiring unit 11 acquires the positions of the first object $A_{15}$ and the second object $A_{25}$ at the time as the first present position and the second present position, respectively. In the example of FIG. 8(a), the first present position $E_{15}$ is situated outside a predetermined area $C_{15}$ corresponding to the object $A_{15}$, and the first distance for a move of the first object $A_{15}$ is thus equal to or greater than a predetermined value. The second present position $E_{25}$ is situated outside a predetermined area $C_{25}$ corresponding to the object $A_{25}$, and the second distance for a move of the second object $A_{25}$ is thus equal to or greater than a predetermined value. The example of FIG. 8(a) further defines a distance $L_{E5}$ between the first present position $E_{15}$ and the second present position $E_{25}$.

In the case where the first object $A_{15}$ and the second object $A_{25}$ are moved as illustrated in FIG. 8(a), if the distance $L_{E5}$ is equal to or smaller than a predetermined value, a distance $L_{E1}$ from the second initial position $D_{25}$ to the first present position $E_{15}$ is smaller than a distance $L_{D5}$ from the second initial position $D_{25}$ to the first initial position $D_{15}$, and a distance $L_{E2}$ from the first initial position $D_{15}$ to the second present position $E_{25}$ is smaller than the distance $L_{D5}$ from the first initial position $D_{15}$ to the second initial position $D_{25}$, the processing executing unit 12 can execute third processing as predetermined processing on the first and the second objects. In this example, the third processing is executed when such a move operation is performed that moves the first and the second objects close to each other and strikes both objects against each other. This enables execution of the third processing by adjusting drag operations on the first and the second objects and thus provides a user interface that is hard to cause incorrect operations and intuitive.

FIG. 8(b) is a diagram illustrating an example of the third processing. As illustrated in FIG. 8(b), upon a decision to execute the third processing, the processing executing unit 12 generates a folder $H_3$ and stores the first object $A_{15}$ and the second object $A_{25}$ in the folder $H_2$. With this example, such an intuitive user interface is provided that stores the first and the second objects in a folder by, for example, dragging the first and the second objects close to each other.

FIG. 8(c) is a diagram illustrating another example of the third processing. As illustrated in FIG. 8(c), upon a decision to execute the third processing, the processing executing unit 12 deletes the first object $A_{15}$ and the second object $A_{25}$. With this example, such an intuitive user interface is provided that deletes the first and the second objects by, for example, dragging the first and the second objects close to each other.

Figure 9:
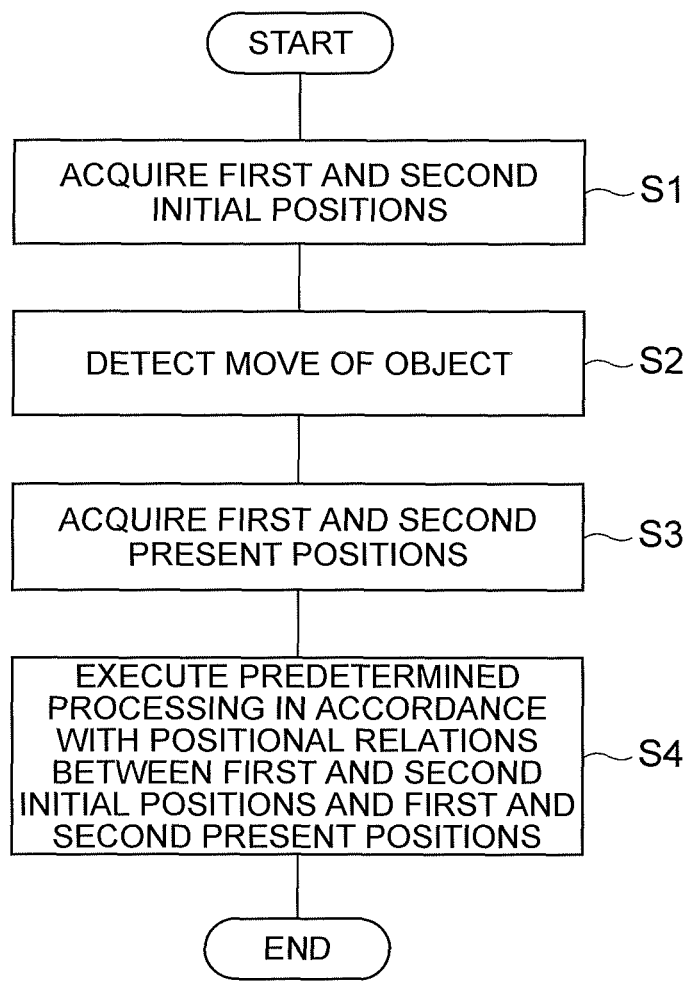
FIG. 9 is a flowchart illustrating processing content of the information processing device.

An information processing method in the information processing device 1 of this embodiment is now described with reference to FIG. 9. FIG. 9 is a flowchart illustrating an example of the content of processing in the information processing method.

The acquiring unit 11 acquires positions of a first and a second objects as respective initial positions at the time when a first and a second designated positions detected by the detecting unit 10a are concurrently included in respective determination areas of the first and the second objects displayed on the display unit 10b (S1).

When a drag operation on an object is performed by a user, the display control unit 13 moves the object in response to the drag operation, and the acquiring unit 11 detects the move of the object (S2).

When at least one of the first and the second objects is moved in response to a move of the corresponding designated position in a state where the designated positions in respective determination areas B of the first and the second objects are kept under detection by the detecting unit 10a during the drag operation of the object, the acquiring unit 11 acquires the positions of the first and the second objects as respective present positions (S3).

The processing executing unit 12 executes predetermined processing in accordance with the positional relations between the first initial position, the second initial position, the first present position, and the second present position (S4).

Figure 10:
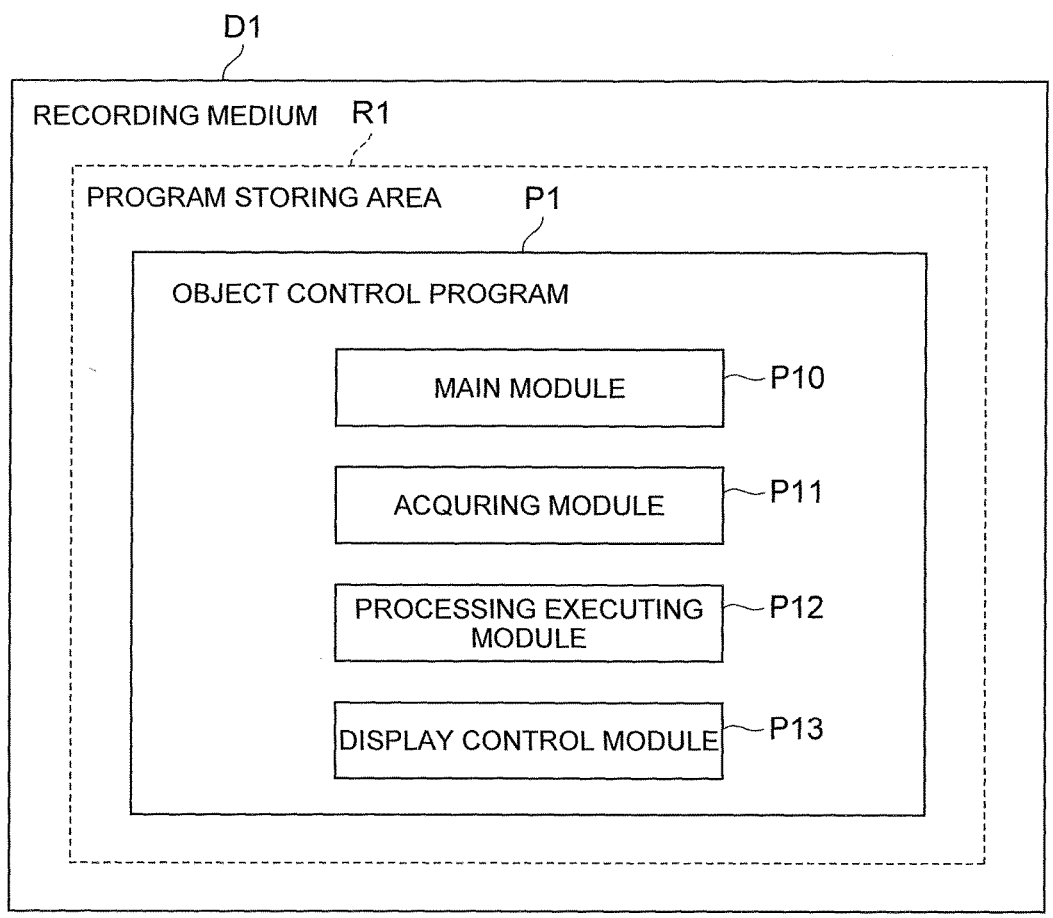
FIG. 10 is a diagram illustrating a configuration of an information processing program.

An information processing program that causes a computer to function as the information processing device 1 is now described with reference to FIG. 10. An information processing program P1 includes a main module P10, an acquiring module P11, a processing executing module P12, and a display control module P13.

The main module P10 performs comprehensive controls on object control processing. Functions implemented by operating the acquiring module P11, the processing executing module P12, and the display control module P13 are the same as those of the acquiring unit 11, the processing executing unit 12, and the display control unit 13, respectively, of the information processing device 1 illustrated in FIG. 1.

The information processing program P1 is provided through a recording medium D1 such as a compact disc read only memory (CD-ROM), a digital versatile disc (DVD), and a read only memory (ROM), or a semiconductor memory. The information processing program P1 may be provided as a computer data signal superimposed on a transmission wave through a communication network.

Figure 11:
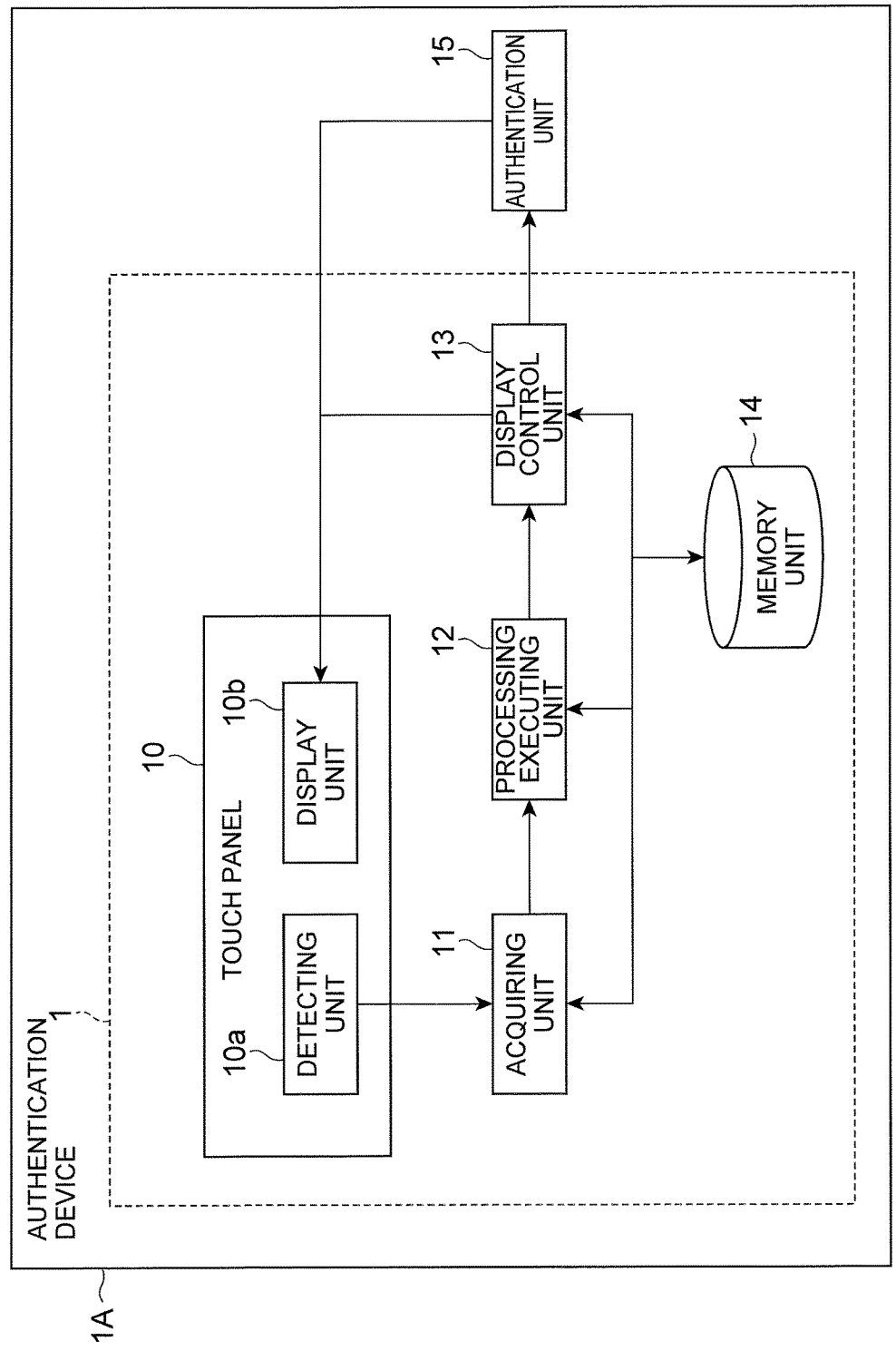
FIG. 11 is a block diagram illustrating a functional configuration of an authentication device.

An authentication device 1A including the information processing device 1 is now described. FIG. 11 is a block diagram illustrating a functional configuration of the authentication device 1A according to this embodiment. The authentication device 1A executes authentication processing on a user, which, for example, determines whether the user is valid, in response to an input to the information processing device 1 from the user.

As illustrated in FIG. 11, the authentication device 1A includes the information processing device 1 and an authentication unit 15. The authentication unit 15 executes authentication processing on a user by determining whether preset processing on a plurality of objects are executed in the information processing device 1. Specifically, the authentication unit 15 executes authentication processing based on the content of processing executed by the processing executing unit 12 and the display control unit 13.

A specific example of the authentication processing is now described with reference to FIG. 12 and FIGS. 13($a$) to 13($c$). FIG. 12 illustrates an example of a table set with contents of processing predetermined for the authentication processing. The table is stored in the memory unit 14, for example. As illustrated in FIG. 12, the predetermined content of processing includes a selected object and a rotation direction on each processing order.

The authentication unit 15 executes the authentication processing on a user, for example, by determining whether certain interchange processing is executed on a plurality of objects as described with reference to FIGS. 6($a$) and 6($b$) and FIG. 7. The authentication unit 15 authenticates a user when processing for interchanging the object "1" and the object "7" and processing for interchanging the object "1" and the object "9", as set on the table in FIG. 12, are sequentially executed by the user.

The authentication processing may include a condition of authentication, the condition being whether each selected object moves clockwise or counterclockwise from its initial position to its present position with a movement center point, which is an intersection of a line segment connecting respective initial positions of the selected objects and another line segment connecting respective present positions of the selected objects, as the center of the move. Specifically, as illustrated in FIG. 12, the authentication processing may include a condition of authentication in which interchange processing on the selected objects (1 and 7) is performed clockwise and interchange processing on the selected objects (1 and 9) is performed counterclockwise.

Figure 13:
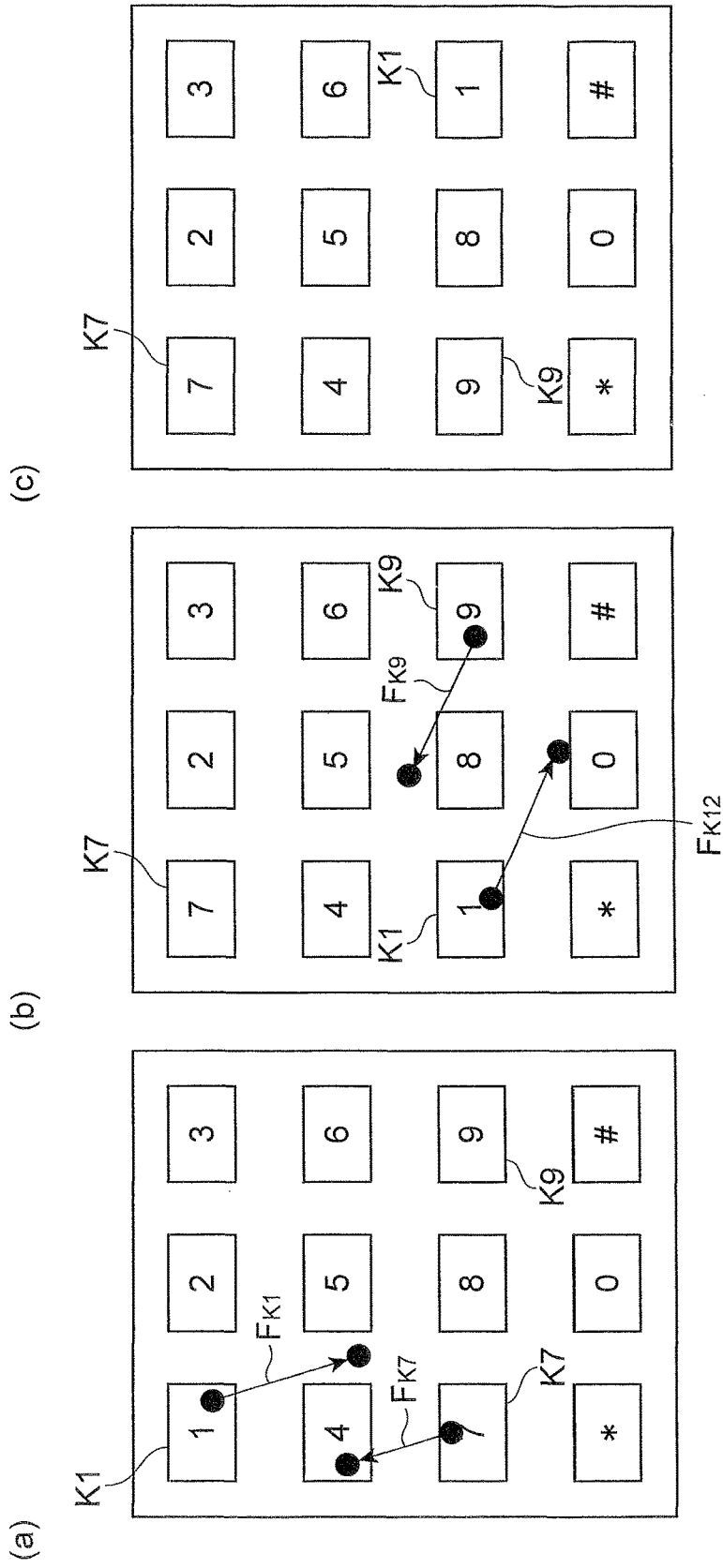
FIG. 13 is a schematic diagram illustrating a specific example of the authentication processing.

FIGS. 13($a$) to 13($c$) are schematic diagrams illustrating a specific example of the authentication processing. In the example of FIG. 13, what is called a ten-key pad is displayed on the display unit 10$b$ of a touch panel. The authentication processing is executed based on an input on the ten-key pad from a user. Respective displayed keys correspond to objects in the information processing device 1.

As illustrated in FIG. 13($a$), when a user drags an object $K_1$ in the direction indicated by an arrow $F_{K1}$ and drags an object $K_7$ in the direction indicated by an arrow $F_{K7}$, the processing executing unit 12 executes processing for interchanging the display positions of the object $K_1$ and the object $K_7$. In response to the processing, the display control unit 13 interchanges the display positions of the objects. At this time, the processing executing unit 12 further acquires, as a condition of the interchange processing on the object $K_1$ and the object $K_7$, a condition in which the objects are interchanged clockwise.

The authentication unit 15 recognizes that the display control unit 13 has executed the interchange processing on the display positions of the object "1" (the object $K_1$) and the object "7" (the object $K_7$) and the drag operation for instructing the interchange processing has been performed clockwise, and determines that processing set on the processing order "1" has been properly executed.

When the user thereafter drags the object $K_1$ in the direction indicated by an arrow $F_{K12}$ and drags an object $K_9$ in the direction indicated by an arrow $F_{K9}$ as illustrated in FIG. 13($b$), the processing executing unit 12 executes processing for interchanging the display positions of the object $K_1$ and the object $K_9$. In response to the processing, the display control unit 13 interchanges the display positions of the objects. At this time, the processing executing unit 12 further acquires, as a condition of the interchange processing on the object $K_1$ and the object $K_9$, a condition in which the objects are interchanged counterclockwise.

The authentication unit 15 recognizes that the processing executing unit 12 has executed the interchange processing on the display positions of the object "1" (the object $K_1$) and the object "9" (the object $K_9$) and the drag operation for instructing the interchange processing has been performed counterclockwise, and determines that processing set on the processing order "2" has been properly executed. FIG. 13($c$) is a diagram illustrating a display example of the touch panel 10 after the processing defined by the processing orders "1" and "2" has been properly executed.

When the processing preset on the table of FIG. 12 is executed as described above, the authentication unit 15 authenticates the user who has operated the authentication device 1A and displays the authentication result on the display unit 10$b$.

The authentication device 1A in this embodiment executes authentication processing by determining whether a predetermined drag operation is performed on the first and the second objects. This facilitates an input for authentication and ensures strict security. Furthermore, the authentication processing is executed by determining whether the interchange processing is executed on predetermined objects. This provides an authentication device with simple and intuitive input operations. Further strict security is obtained by including rotation directions as a condition of authentication in an operation to interchange positions of objects, the rotation directions corresponding to trajectories on which the first and the second objects to be interchanged move to change respective relative positions.

In the information processing device 1, the information processing method, and the information processing program P1 of the embodiments, a user designated position on the display unit 10a is detected by the detecting unit 10b, and at least one of the first and the second objects displayed on the display unit 10a is moved by moving the corresponding user designated position detected in a determination area based on the position of the object. The acquiring unit 11 acquires initial positions and present positions relating to moves of the first and the second objects. Based on the positional relations between the initial positions and the present positions, predetermined processing is executed on the first and the second objects. A user can execute processing on the objects with such a simple operation that moves the first and the second objects displayed. Furthermore, a user can execute desired processing by performing an operation to move the objects to adjust respective initial positions and the present positions of the objects. This reduces incorrect operations.

The present invention has been described in detail based on the embodiments thereof. The present invention, however, is not limited to the embodiments. Various changes can be made without departing from the scope of the present invention.

INDUSTRIAL APPLICABILITY

According to the embodiments, in an instruction operation to execute desired processing on an object displayed on a touch panel, provided is a user interface that can reduce incorrect operations without additional operation procedures.

REFERENCE SIGNS LIST

1 . . . information processing device, 1A . . . authentication device, 10 . . . touch panel, 10a . . . detecting unit, 10b . . . display unit, 11 . . . acquiring unit, 12 . . . processing executing unit, 13 . . . display control unit, 14 . . . memory unit, 15 . . . authentication unit, P1 . . . information processing program, P10 . . . main module, P11 . . . acquiring module, P12 . . . processing executing module, P13 . . . display control module

The invention claimed is:
1. An information processing device comprising:
at least one display;
at least one memory operable to store program code; and
at least one processor operable to read the program code and operate as instructed by the program code, wherein at least one of said at least one processor is configured to:
  display a plurality of objects on a display screen of the at least one display;
  detect a plurality of user designated positions on the display screen;
  when one of the plurality of user designated positions is included in a determination area set based on a position of an object among the plurality of objects in a state where the one of the plurality of user designated positions is under detection, move the object in response to a move of the one of the plurality of user designated positions;
  in response to detecting the plurality of user designated positions on the display screen, acquire a position of a first object and a position of a second object as an initial position of the first object and an initial position of the second object when a first user designated position and a second user designated position are concurrently included in respective determination areas of the first object and the second object;
  acquire the positions of the first object and the second object as a present position of the first object and a present position of the second object after the initial positions of the first object and the second object are acquired, when at least one of the first object and the second object is moved in a state where the first user designated position and the second user designated position are kept under detection;
  in response to the initial position of the first object being different from the present position of the first object, determine a first distance from the initial position of the first object to the present position of the first object;
  in response to the initial position of the second object being different from the present position of the second object, determine a second distance from the initial position of the second object to the present position of the second object;
  determine a third distance between the present position of the first object and the present position of the second object;
  execute a first processing on the first object and the second object when the first distance from the initial position of the first object to the present position of the first object is less than a first predetermined value, the second distance from the initial position of the second object to the present position of the second object is equal to or greater than a second predetermined value, and the third distance between the present position of the first object and the present position of the second object is equal to or less than a third predetermined value; and
  execute a second processing different from the first processing on the first object and the second object when the initial position and the present position of the first object are different and the initial position and the present position of the second object are different, wherein
the present position is determined at an end of movement of the at least one of the first object and the second object, and
the at least one of said at least one processor is further configured to execute the second processing on the first object and the second object when the first distance from the initial position of the first object to the present position of the first object is equal to or greater than a fourth predetermined value, the second distance from the initial position of the second object to the present position of the second object is equal to or greater than a fifth predetermined value, a first line segment connecting the initial position of the first object and the initial position of the second object intersects with a second line segment connecting the present position of the first object and the present position of the second object at a movement center point, and a rotation angle, which is made by a third line segment connecting the initial position of the first object and the movement center point and a fourth line segment connecting the present position of the first object and the movement center point and indicates a move of the first object from the initial position to the present position thereof with the movement center point as a center, is equal to or greater than a predetermined angle.

2. The information processing device according to claim 1, wherein the at least one of said at least one processor is further configured to:
execute the second processing, when the first object moves clockwise or counterclockwise from the initial position to the present position thereof with the movement center point as the center.

3. The information processing device according to claim 1, wherein the at least one of said at least one processor is further configured to:
execute the second processing on the first object and the second object when the first distance from the initial position of the first object to the present position of the first object is equal to or greater than the first predetermined value, and the second distance from the initial position of the second object to the present position of the second object is equal to or greater than the second predetermined value different from the first predetermined value.

4. The information processing device according to claim 1, wherein the at least one of said at least one processor is further configured to:
execute a third processing, instead of the second processing, on the first object and the second object when the first distance from the initial position of the first object to the present position of the first object is equal to or greater than a sixth predetermined value, the second distance from the initial position of the second object to the present position of the second object is equal to or greater than a seventh predetermined value, the third distance between the present position of the first object and the present position of the second object is equal to or less than an eighth predetermined value, a fourth distance from the initial position of the second object to the present position of the first object is less than a distance from the initial position of the second object to the initial position of the first object, and a fifth distance from the initial position of the first object to the present position of the second object is less than a distance from the initial position of the first object to the initial position of the second object.

5. An authentication device that comprises the information processing device according to claim 1, wherein
the at least one of said at least one processor is further configured to execute authentication processing on a user input by determining whether predetermined processing on present objects has been executed in the information processing device.

6. An authentication device that comprises the information processing device according to claim 1, wherein
the second processing is interchange processing that interchanges display positions of the first object and the second object with each other, and
the at least one of said at least one processor is further configured to execute authentication processing on a user input by determining whether the interchange processing has been executed on preset objects in the information processing device.

7. An information processing method performed by a computer, comprising:
displaying a screen including a plurality of objects on at least one display;
detecting a plurality of positions designated by a user on the screen;
acquiring positions of a first object and a second object as an initial position of the first object and an initial position of the second object when a first designated position and a second designated position are concurrently included in respective determination areas set based on the positions of the first object and the second object;
moving at least one of the first object and the second object in response to a move of at least one of the first designated position and the second designated position in a state where the first designated position and the second designated position in the respective determination areas of the first object and the second object are kept under detection;
acquiring the positions of the first object and the second object as a present position of the first object and a present position of the second object after the moving of at least one of the first object and the second object;
in response to the initial position of the first object being different from the present position of the first object, determine a first distance from the initial position of the first object to the present position of the first object;
in response to the initial position of the second object being different from the present position of the second object, determine a second distance from the initial position of the second object to the present position of the second object;
determine a third distance between the present position of the first object and the present position of the second object;
execute the first processing on the first object and the second object when the first distance from the initial position of the first object to the present position of the first object is less than a first predetermined value, the second distance from the initial position of the second object to the present position of the second object is equal to or greater than a second predetermined value, and the third distance between the present position of the first object and the present position of the second object is equal to or less than a third predetermined value; and
execute a second processing different from the first object and the second object when the initial position and the present position of the first object are different and the initial position and the present position of the second object are different, wherein
the present position is determined at an end of movement of the at least one of the first object and the second object, and
execution of the second processing comprises executing the second processing on the first object and the second object when the first distance from the initial position of the first object to the present position of the first object is equal to or greater than a fourth predetermined value, the second distance from the initial position of the second object to the present position of the second object is equal to or greater than a fifth predetermined value, a first line segment connecting the initial position of the first object and the initial position of the second object intersects with a second line segment connecting the present position of the first object and the present position of the second object at a movement center point, and a rotation angle, which is made by a third line segment connecting the initial position of the first object and the movement center point and a fourth line segment connecting the present position of the first object and the movement center point and indicates a move of the first object from the initial position to the present position thereof with the movement center point as a center, is equal to or greater than a predetermined angle.

8. A non-transitory computer-readable storage medium having stored thereon a program which, when executed by a computer, causes the computer to:
  display a screen including a plurality of objects on at least one display;
  detect a plurality of positions designated by a user on the screen;
  acquire positions of a first object and a second object as an initial position of the first object and an initial position of the second object when a first designated position and a second designated position are concurrently included in respective determination areas set based on the positions of the first object and the second object;
  move at least one of the first object and the second object in response to a move of at least one of the first designated position and the second designated position in a state where the first designated position and the second designated position in the respective determination areas of first object and the second object are kept under detection;
  acquire the positions of the first object and the second object as a present position of the first object and a present position of the second object after the move of at least one of the first object and the second object;
  in response to the initial position of the first object being different from the present position of the first object, determine a first distance from the initial position of the first object to the present position of the first object;
  in response to the initial position of the second object being different from the present position of the second object, determine a second distance from the initial position of the second object to the present position of the second object;
  determine a third distance between the present position of the first object and the present position of the second object;
  execute the first processing on the first object and the second object when the first distance from the initial position of the first object to the present position of the first object is less than a first predetermined value, the second distance from the initial position of the second object to the present position of the second object is equal to or greater than a second predetermined value, and the third distance between the present position of the first object and the present position of the second object is equal to or less than a third predetermined value; and
  execute a second processing different from the first processing on the first object and the second object when the initial position and the present position of the first object are different and the initial position and the present position of the second object are different, wherein
  the present position is determined at an end of movement of the at least one of the first object and the second object, and
  execution of the second processing comprises executing the second processing on the first object and the second object when the first distance from the initial position of the first object to the present position of the first object is equal to or greater than a fourth predetermined value, the second distance from the initial position of the second object to the present position of the second object is equal to or greater than a fifth predetermined value, a first line segment connecting the initial position of the first object and the initial position of the second object intersects with a second line segment connecting the present position of the first object and the present position of the second object at a movement center point, and a rotation angle, which is made by a third line segment connecting the initial position of the first object and the movement center point and a fourth line segment connecting the present position of the first object and the movement center point and indicates a move of the first object from the initial position to the present position thereof with the movement center point as a center, is equal to or greater than a predetermined angle.

* * * * *